UNITED STATES PATENT OFFICE.

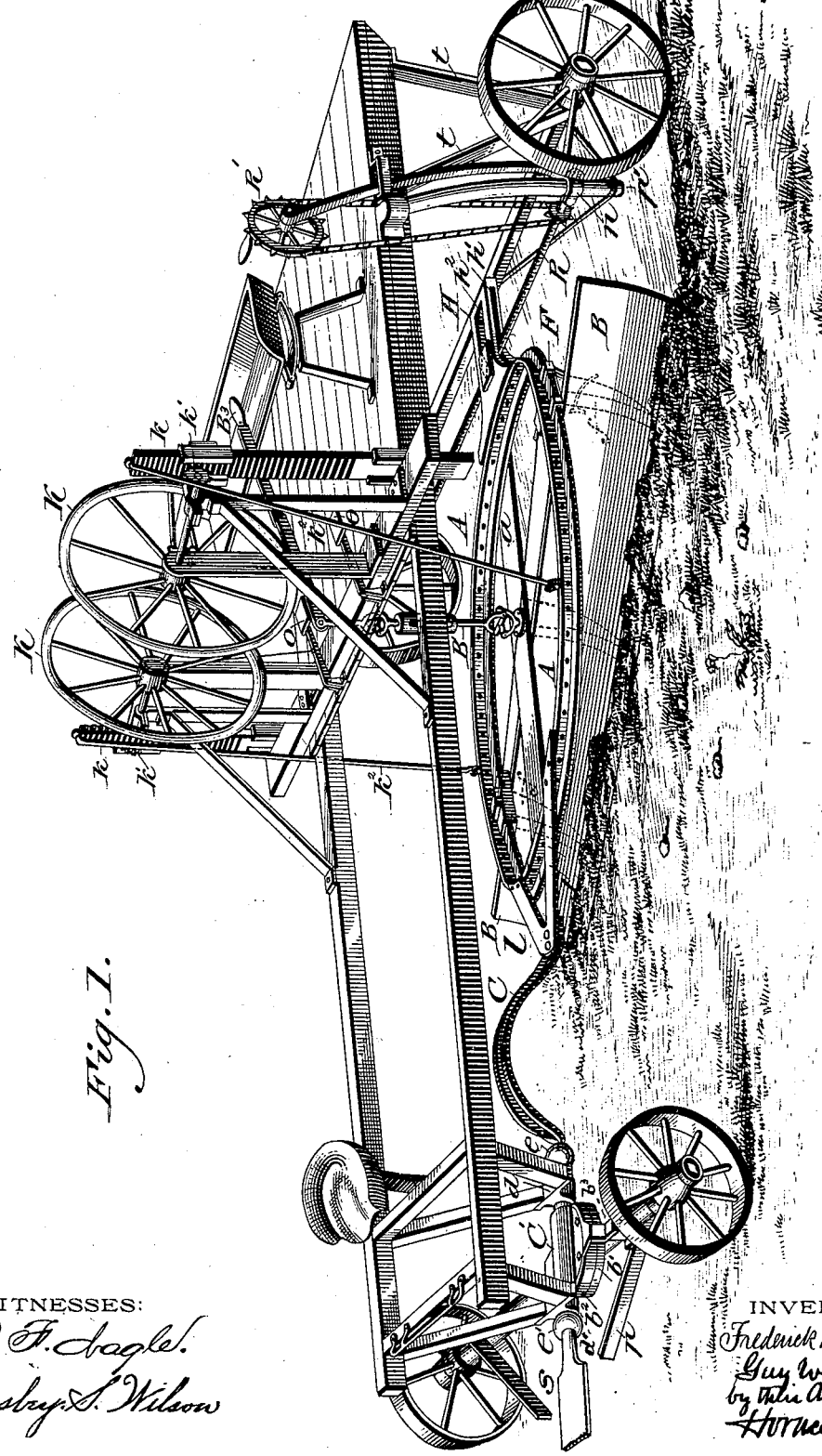

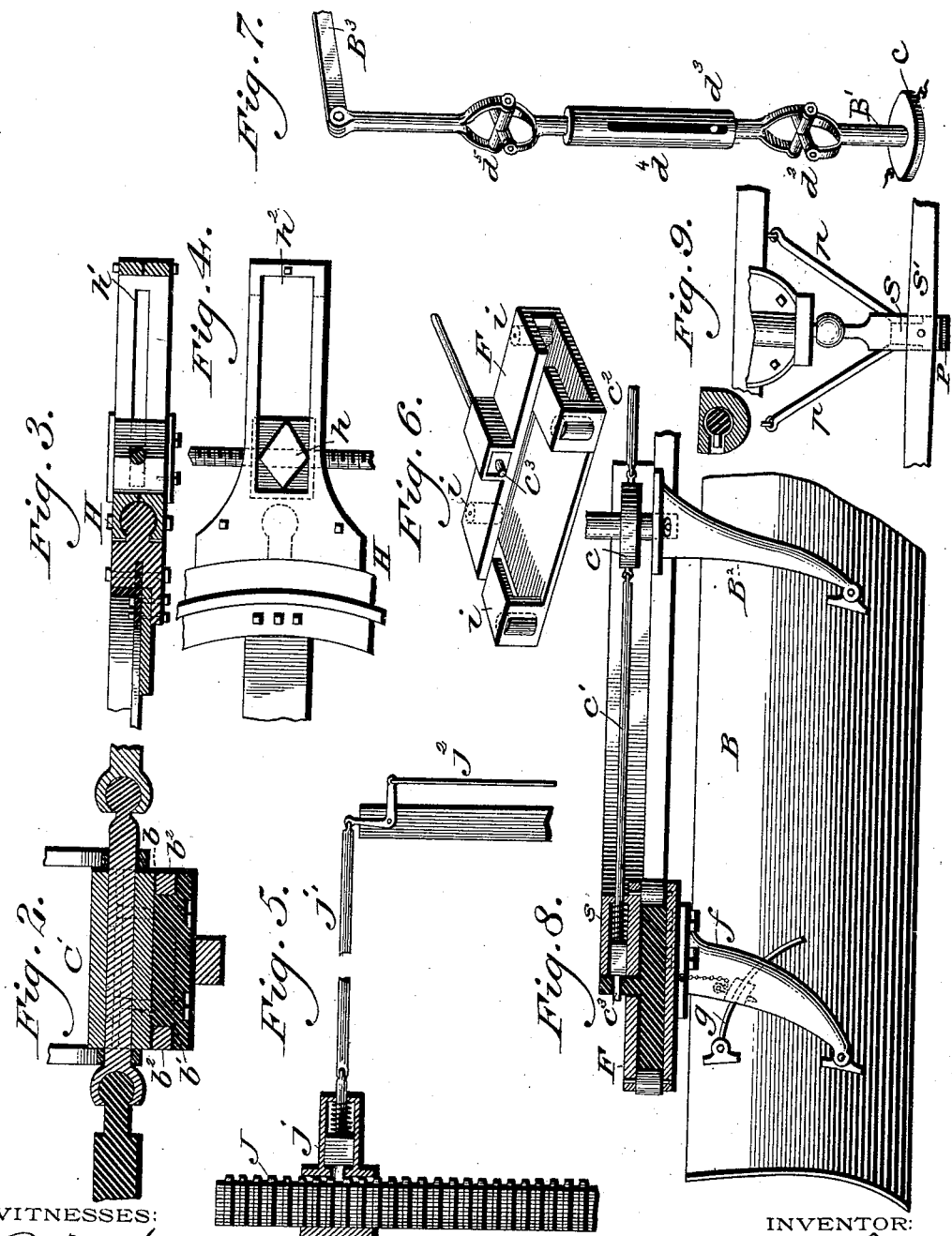

FREDERICK M. PENNOCK AND GUY WEBSTER, OF KENNETT, PENNSYLVANIA.

ROAD-SCRAPER.

SPECIFICATION forming part of Letters Patent No. 389,897, dated September 25, 1888.

Application filed April 11, 1888. Serial No. 270,264. (No model.)

*To all whom it may concern:*

Be it known that we, FREDERICK M. PENNOCK and GUY WEBSTER, of the township of Kennett and county of Chester, State of Pennsylvania, have jointly invented a certain new and useful Improvement in Road-Scrapers; and I declare the following to be a full, clear, and exact description thereof, reference being had to the accompanying drawings, forming part of this specification.

Our invention has relation to road-scrapers wherein a direct and uninterrupted draft is secured from the team or other motive power to the scraper-blade; and it consists in the elements and features, as hereinafter particularly described.

The object of our invention is simplicity of construction and mechanism and the production of a machine wherein the draft shall be applied directly to the scraper bar or blade, and the working parts directly suported by the axles rather than by the frame or carriage, which is thereby relieved of the strains, and which consequently allows of the employment of a much lighter and less cumbersome carriage.

We will now describe our invention, so that others skilled in the art to which it appertains may make and use the same, reference being had to the accompanying drawings, in which similar letters of reference refer to similar parts throughout.

Figure 1 shows a perspective view of the scraper completely constructed and ready for operation. Fig. 2 represents a sectional side elevation of the carriage-turning device or fifth-wheel attached to the forward axle. Fig. 3 shows a partially-sectional side view of the rear guide of the circular propelling-frame adapted for the purpose of lateral adjustments. Fig. 4 shows a top elevation of the same. Fig. 5 represents a detailed view of the vertically-adjustable rack-bar for elevating and lowering the circular propelling-frame, showing the dog or pawl adjustment for securing the same at the desired height. Fig. 6 is a perspective view of one of the two opposite scraper-bar carriers designed to play on the circular propelling-frame. Fig. 7 represents the vertical center-rod for horizontally rotating the scraper-bar, and also for engaging or disengaging the locking device of the scraper-bar carrier to or from the circular propelling-frame, showing the universal joints and the extension and shortening sleeve device. Fig. 8 is a rear view of the scraper-bar, showing both the adjustment of the vertical rotating rod to the scraper-bar and the adjustment of the scraper-bar, through the medium of its carrier device, to the circular propelling-frame, as likewise the device for horizontally rotating the scraper-bar and the engaging-pawl device operated by the vertical rod. Fig. 9 shows the adjustment of the whiffletree through the medium of the whiffletree-bar directly to the draft-beam, to which it is secured by a ball-and-socket joint.

The circular propelling-frame A is rigidly secured to the draft-beam C by means of the castings or plates $l\ l$. The draft-beam C is provided at the points $e\ e'$ with ball-and-socket or universal joints in order to allow of the necessary movements at these points. At the point $e$ the draft-bar has both a vertical and a lateral motion—vertical when the circular propelling-frame is elevated or lowered, and a lateral when the frame is shifting to one side. At the joint $e'$ the whiffletree-bar S connects with the draft-beam C direct, and as the motion of that bar tends to act both vertically and horizontally, by reason of the motion of the horses, we provide a ball-and-socket joint, $e'$. The tongue P, as shown, is connected with the front axle by means of the hounds $p\ p$, and serves merely as a guide and holdback to the machine. The whiffletree S', being connected to the whiffletree-bar S for draft purposes, is entirely disconnected from the tongue P. The draft-beam C is pivotally connected to the front axle by a fifth-wheel device, in which no center-pin or king-bolt is employed. That portion of the draft-beam between the joints $e\ e'$, being rounded, passes through a sleeve, C', as shown in detail in Fig. 2. This sleeve C' is attached to a solid disk or horizontal wheel, $b$, of a proper diameter and thickness, which is also firmly attached to a second solid disk or horizontal wheel, $b'$, of about the same thickness, but of a somewhat greater diameter. Around the circumference of the smaller central disk, $b$, is the ring, or what might be termed the "fifth-wheel," $b^2$, of a thickness a fraction less than that of the disk $b$, which is secured rigidly to the front axle by the ears of clips $b^3$. When, therefore, the front axle is turned by the tongue, the ring or fifth-wheel $b^2$ revolves on the disk $b$, at the same time being secured in position by the sleeve C' above and the disk $b'$ below.

The carrier-frame of the machine is adjusted to the draft-beam and the front axle by V-shaped supports, which are secured to the castings $d\ d'$, journaled around the rounded draft-bar C at the extremities of the sleeve C'. This journaling prevents any rocking of the carriage-frame, as when one of the front wheels passes over a rock or some inequality in the road occurs, and reduces the strain on the frame to a minimum and at the same time produces smoother work. The rear of the carrying-frame is secured, as shown in the drawings, directly to the rear axle by the supports $t\ t$.

The scraper-blade B is movably adjusted to the circular propelling-frame A by means of the brackets $f\ f$, the lower ends of which are pivotally adjusted to the rear of the scraper-blade below its center line, one near each end, and the upper extremities rigidly attached to the carrier F, which is provided with bearings to travel on the rail of the circular propelling-frame, which is shown in detail in Figs. 6 and 8. The desired vertical angle of the scraper-blade is attained by an adjustable device such as shown in Fig. 8 as a segmental rod, $g$, fastened to the upper part of the rear of the scraper-blade B and adjustably secured by a pin or thumb-screw to the bracket $f$.

In order to rotate the scraper-blade B to the desired angle on the circular propelling-frame A, the vertical rod B' is provided, attached to the scraper-blade B at the center of its length, and, extending upward above the level of the platform - floor, is operated by the lever $B^3$, which, when moved horizontally, being firmly connected to the rod B', rotates the scraper horizontally on the circular propelling-frame A. The lower extremity of the rod B' is connected to the scraper-blade through the medium of the extension-casting $B^2$. This casting $B^2$ is firmly attached to the scraper-blade B at the center of its length, yet so hinged as to allow of the angular adjustment of the blade B by means of the device $g$. The upper end of the extension-casting $B^2$ is supported or journaled in the cross-piece $a$, which runs through the diameter of the circular propelling-frame A. The lower extremity of the vertical rod B' is so keyed into the upper extremity of the casting $B^2$ that the rod will make, say, a one thirty-second of a revolution before the key operates and turns the casting and rotates the scraper-blade. A suitable key device is shown in Fig. 8 and in the small diagram connected therewith of a cross horizontal section.

The vertical rod B' performs a double duty in the one motion. When rotated, before its motion tends to move the scraper-blade B by means of the loose key device above described, the disk $c$, being firmly secured to the vertical rod B' a few inches above the top of the casting $B^2$, turns, and in so doing draws the horizontal rods $c^2\ c'$, which release the dogs or pawls $c^3$, provided on the carrying device F and designed to engage in orifices provided at proper intervals in the perpendicular flange of the T circular propelling-frame for the purpose of rigidly holding the scraper-blade to the circular propelling-frame at the desired horizontal angle. When the lever $B^3$ has rotated the scraper-blade to the proper position and been released from the hand, the pawls spring into their orifices by means of spiral springs $s$ and firmly engage the scraper-blade B to the circular frame A in its proper position, as before described.

In order to facilitate the traveling of the scraper-blade carrier F on the circular propelling-frame A, vertical rollers $i\ i$ are provided to play on the outside edges of the rail.

As will be seen, when the circular frame and scraper-blade are laterally shifted by the means and for the purpose hereinafter described, the vertical rod B' would require additional length. In order to meet this requirement, a sleeve, $d^4$, is provided about the center of the length of the rod B', firmly attached to one section of the rod while the other section plays in the sleeve $d^4$, guided and secured by the pin $d^3$, attached thereto and playing in the longitudinal slot in the sleeve, which allows of the automatic expansion and contraction of the vertical rod B'. The universal joints $d^2\ d^5$ are to provide for the consequent break in the direct line of the rod B', as when the circular frame and scraper-blade are elevated, lowered, or side-shifted.

In order to shift to one side or to the other the scraper-blade, which is frequently necessary in practical road-making, a screw-threaded rod, R, is provided in the rear of the machine, extending across its width, and is journaled into a brace or clip, $n$, adapted to slide up and down on a guide-rod, $p'$, secured to the frame of the carriage, upon which the brace or clip $n$ plays and rises or falls as the circular frame A and scraper-blade B are elevated or lowered, as hereinafter described. The screw-threaded rod R is revolved by a suitable means of connection operated from the platform, as by the sprocket-wheel R', connected to the rod R by a link chain, and there operating on another sprocket-wheel of smaller diameter. The upper wheel, being supported by an upright connected directly to the clip $n$, consequently rises and falls with the upward and downward motion of the rod R.

Connected pivotally to the circular propelling-frame A, in a line with the draft-bar C and in the rear of the frame A, is the nut-securing bracket H, provided with side longitudinal slots, $h'$, through which the rod R passes freely. Another longitudinal vertical slot, $h^2$, is provided, into which a screw-threaded nut, $h$, is fitted, designed to play in the said longitudinal slot $h$, through which said nut $h$ the rod R operates, and it is retained in its position in the slot $h^2$ by top and bottom plates, as shown in Figs. 3 and 4. When the screw-threaded rod R is revolved through the nut $h$, the whole circular propelling-frame A will be shifted to the one side or to the other, carrying with it the scraper-blade. As the pivotal point of this motion is the joint $e$, and a segment of a circle will be described therefrom, consequently, in order to prevent any binding of the nut $h$ in the slot $h^2$, the shape of the nut $h$ is preferably somewhat diamond shape. The rod R, being rigid, plays in the slot $h'$ when the radius of the circle is being described.

Another motion of the scraper-blade is frequently necessary—the elevating and depressing of the respective ends. We accomplish this by providing a sliding tooth-rack, $k$, on either side of the carriage-frame, which are operated up and down by means of their respective cog-wheels $k'$ working in the racks independent of each other and rotated independently by means of two large hand-wheels, K, adjusted to the respective inner ends of their respective shafts, all suitably journaled and guided on substantially-secured uprights. As the hand-wheels K, or either of them, are rotated, the cog wheel $k'$ at the end of the shaft also rotates, and, operating in the teeth of the rack $k$, elevates or lowers it, as the case may be. Rods $k^2$, attached to the upper extremity of each of the racks $k$ by ball-and-socket joints, are attached suitably to the upper flange of the rail of the circular rail A, opposite each other. When, therefore, either rack is elevated or depressed, the scraper-blade B, through the medium of the circular propelling-frame A, is elevated or depressed at the respective end desired to be operated upon.

In order to retain the scraper-blade B at the desired elevation, a locking device, as shown in Fig. 5, is provided on the inner side of each rack, where a series of teeth, J, are provided, and into which a spring dog or pawl, $j$, is adapted to engage, being operated by the foot-treadle or lever $o$, connected therewith by means of the connecting-rods $j'$ $j^2$. By this means the scraper-blade can be retained or disengaged at any desired height by a movement of the foot on the treadle.

As considerable strain is brought to bear on the guide-rods $p'$, they are preferably braced from the rear by braces or rods secured to its lower extremity and attached to the rear axle in some such manner as shown in the drawings.

The operation of our machine can be readily understood from the foregoing detailed description of its parts. It combines simplicity of construction, lightness of weight, and cheapness with great strength and adaptability to all kinds of road making and repairing, its great strength being in the direct draft applied to the scraper-blade by the particular construction described, and its adaptability for all work being principally in what might be termed "universal adjustment" of the scraper-blade, combined with the great facility with which all the requisite adjustments are attained.

Having thus described our invention, what we claim, and desire to secure by Letters Patent, is—

1. In a road-machine, a four-wheeled supporting-carriage, and a scraper-blade adapted to be shifted circularly by a vertical rod passing through the center of a circular propelling-frame and attached to the scraper-blade near the center of its length, said scraper-blade supported adjustably from the circular frame by means of carrier-brackets, the lower ends of which are hinged to the rear of the said scraper-blade, the center of the circular frame being over the center of the length of the scraper-blade, substantially as set forth and described.

2. In a road-machine, a four-wheel supporting-carriage, a scraper blade provided with means for independent vertical adjustment at each end, a draft-rod passing through the fifth-wheel, forming an axis of horizontal lateral vibration of the front truck with respect to the main frame, and a fifth-wheel constructed so as to form bearings for the draft bar, substantially as shown and described.

3. In a road-machine, a scraper-blade, a direct draft-bar, a draft-connection rod passing through the fifth-wheel and forming the axis of lateral vibration for the front truck, and a fifth-wheel, substantially as shown and described.

4. In a road-machine, a four-wheel carriage, a scraper-blade, a draft-bar connected thereto directly or indirectly, the forward end of which is universally jointed to the rear end of a connecting-rod, a draft-connection rod extending from thence forward, suitable bearing in the fore part of the carriage for the draft-connection rod, and a whiffletree-bar universally jointed to the forward end of the draft-connection rod, substantially as described.

5. In a road-machine, in combination with a front axle provided with wheels, a raised fifth-wheel or disk having a hollowed center attached by clips or otherwise to said axle, a disk adapted to rotate horizontally within said hollowed disk or fifth-wheel, and circular plates of greater diameter above and below secured thereto and together, which, when attached, secure movably between said upper and lower plates the fifth-wheel or hollowed disk attached to the axle and serve to guide it when the front truck is turned at an angle to the main frame of the carriage, to which the said disk and plates are attached rigidly or pivotally, the upper portion of the said capping-plate forming a longitudinal sleeve, through which passes a draft-connecting rod connected to the main frame by journal-bearings forming the axis of lateral vibration for the front truck, substantially as set forth and described.

6. In a road-making machine, a scraper-blade, brackets or feet to support each end of the said scraper-blade from the rear and connected with the circular draft-frame, a circular draft-frame provided with notches for locking, and sliding carriages provided with friction-rollers, to which are secured the scraper-blade-supporting brackets or feet and adapted to roll on opposite sides of said circular frame, said sliding carriages provided with spring pawls or dogs for locking, substantially as set forth and described.

7. In a road-machine, a scraper-blade adapted to be adjusted at various horizontal angles to the line of the draft, a universally-jointed vertical shaft attached to a point near the middle point of the blade and extending upward through a bearing above, and a lever for turning or reversing said scraper-blade, substantially as shown and described.

8. In a road-machine, a scraper-blade arranged for horizontal angular adjustment upon its middle point, a vertical rotating shaft attached to a point near the middle of the scraper-bar, provided with means for locking and unlocking said scraper-blade in its various positions of horizontal angular adjustment and with suitable means for being turned, all in the manner and for the purpose substantially as shown and described.

9. In a road-machine, a scraper-blade adjusted for horizontal rotation about a point near its middle point, a vertical shaft keyed in a bearing attached to the scraper-blade near the said middle point in such a manner as to allow of a slight rotation of the vertical shaft in the bearing before it rotates the scraper-blade, a bearing, a disk secured rigidly upon the vertical shaft, a notched circular draft-frame, opposite carriages supporting scraper-bar, spring-bolts for locking provided thereon, rods or connections passing to opposite portions of the disk adjusted upon the vertical shaft, and a suitable crank or wheel above for rotating said shaft, substantially as and for the purposes shown and described.

10. In a road-machine, a scraper-blade adjustable at various angles, a notched circular frame, opposite carriages provided with spring pawls or bolts for locking, a vertical shaft to rotate the scraper-blade, secured about its middle point and consisting of sections arranged so that its length may be automatically regulated to conform to the elevation of the scraper-blade, and provided with universal joints to accommodate its upper and lower extremities in their bearings without binding, while the middle section of the shaft may change its angle from the vertical with the various angular adjustments of the scraper-blade, and means thereon provided for simultaneously releasing the two opposite spring-dogs from their engagement with the notched circular frame, together with a lever secured above to the vertical shaft for rotating the same, in the manner and for the purpose substantially as described.

11. In a road-machine, a scraper-blade provided with means for independent vertical adjustment at both ends, a draft-frame extending rearwardly from the bar at its middle point, a rearwardly-extending bracket adjusted to the draft-frame pivotally and provided with a vertically-cut longitudinal slot in the middle and a horizontal longitudinal slot on each side of said bracket, a nut adapted to slide in the middle longitudinal slot, a screw-threaded rod passing freely through the respective horizontal longitudinal slot in the sides of the bracket and engaging the nut, and bearings for the screw-threaded rod at each side of the machine to play in, adjusted on a downwardly-projecting slide or guide attached to the frame above adapted to secure the bearings of the screw-threaded rod in proper place at the various positions of vertical adjustment of the scraper-blade, together with means for rotating said screw, in the manner and for the purposes as hereinbefore set forth and described.

In testimony whereof we have hereunto set our hands this 6th day of April, A. D. 1888.

FREDERICK M. PENNOCK.
GUY WEBSTER.

Witnesses:
HOWARD H. POLK,
WILLIAM W. POLK.